(12) United States Patent
Marchadour (10) Patent No.: US 7,048,157 B2
(45) Date of Patent: May 23, 2006

(54) METERING MACHINE

(75) Inventor: Jean-Charles Marchadour, Pont-l' Abbe (FR)

(73) Assignee: Tremark Technologies Inc., Quebec (CA)

(*) Notice: Subject to any disclaimer, the term of this patent is extended or adjusted under 35 U.S.C. 154(b) by 263 days.

(21) Appl. No.: 10/644,332

(22) Filed: Aug. 20, 2003

(65) Prior Publication Data

US 2004/0035893 A1 Feb. 26, 2004

(30) Foreign Application Priority Data

Aug. 21, 2002 (FR) .................... 02 10441

(51) Int. Cl.
*G01F 11/20* (2006.01)
*B01F 15/02* (2006.01)

(52) U.S. Cl. .................. 222/413; 222/226; 222/309; 222/333; 366/154.1; 366/192

(58) Field of Classification Search ............... 222/226, 222/233, 236, 309, 333, 410, 412, 413, 434; 366/154.1, 192

See application file for complete search history.

(56) References Cited

U.S. PATENT DOCUMENTS

| 2,032,163 | A | * | 2/1936 | Bagby | 417/517 |
| 2,716,510 | A | * | 8/1955 | Massmann | 222/227 |
| 4,399,932 | A | | 8/1983 | Zimmermann | 222/380 |
| 4,566,612 | A | * | 1/1986 | von Kreuter | 222/309 |
| 4,991,632 | A | * | 2/1991 | Nordmeyer et al. | 141/1 |
| 5,080,148 | A | * | 1/1992 | Florida | 141/266 |
| 5,088,517 | A | | 2/1992 | Bersch | 137/101 |
| 5,441,173 | A | * | 8/1995 | Koval et al. | 222/63 |
| 5,709,322 | A | * | 1/1998 | Ricciardi | 222/227 |

OTHER PUBLICATIONS

English translation of French Search Report Application No. 0210441 dated May 2, 2003.

* cited by examiner

*Primary Examiner*—Patrick Brinson
(74) *Attorney, Agent, or Firm*—McCormick, Paulding & Huber LLP (57) ABSTRACT

A metering machine comprising a frame receiving a hopper, at least one duct opening out into the hopper in the vicinity of a bottom thereof and receiving firstly a portion of a transfer screw extending at the bottom of the hopper, and at least one metering cylinder which slidably receives a suction and delivery piston and which is connected to the duct via a plug valve, wherein the metering cylinder and the duct have axes forming an angle of approximately at least 90° between them.

10 Claims, 6 Drawing Sheets

FIG_4

FIG. 5

FIG_6

METERING MACHINE

This application is entitled to the benefit of and incorporates by reference essential subject matter disclosed in French Patent Application No. 02 10441 filed on Aug. 21, 2002.

FIELD OF THE INVENTION

The present invention relates to a metering machine that can be used in installations for packaging and in particular for canning thick foods such as meats, pates, corned beef, sauerkraut, non-chopped spinach, cabbage, etc., and foods in the form of semi-solid clumps such as grated carrot, with or without juice.

BACKGROUND OF THE INVENTION

A metering machine generally comprises a frame receiving a hopper that serves to receive, in loose form, the food for canning, a duct that opens out in the hopper in the vicinity of a bottom thereof and that receives a portion of a transfer screw or "auger" extending along the bottom of the hopper, and a metering cylinder that slidably receives a suction and delivery piston. For reasons of compactness, the metering cylinder is disposed horizontally under the hopper. The bottom of the hopper and the duct are inclined relative to the horizontal so that the cylinder and the duct form an acute angle between them and are connected together via a plug valve. That type of machine is not adapted to all kinds of food because some foods, in particular grated carrot and sticky foods tend to form a blockage in the vicinity of the plug valve. If the blockage is not detected in time, and if the transfer screw is not stopped, the force opposing the movement of the food increases due to the blockage and increases the mechanical stresses to which the transfer screw and the drive members for driving said screw are subjected. That might damage one or more components of the machine.

The technological background to the invention can be supplemented by citing Document U.S. Pat. No. 4,399,932 which describes a volumetric dispenser with a valve having two valve members offset angularly on a common rotary shaft, and Document U.S. Pat. No. 5,088,517 which describes an injector for injecting a flowable additive into a stream of liquid.

SUMMARY OF THE INVENTION

An object of the invention is to provide a metering machine that does not suffer from the drawbacks and limitations of the prior machines, and in particular a machine that is adapted to foods that are difficult to meter out, such as grated carrots or sticky foods.

The invention provides a metering machine comprising a frame receiving a hopper, at least one duct opening out into the hopper in the vicinity of a bottom thereof and receiving firstly a portion of a transfer screw extending at the bottom of the hopper, and at least one metering cylinder which slidably receives a suction and delivery piston and which is connected to the duct via a plug valve, the metering cylinder and the duct having axes forming an angle of approximately at least 90° between them.

Thus, the movement of the food between the metering cylinder and the duct is facilitated, thereby reducing the risk of a blockage forming.

Preferably, the duct and the transfer screw are substantially horizontal, and the metering cylinder extends substantially vertically under the plug valve.

The metering cylinder is then made easier to fill under the effect of gravity.

Advantageously, the piston and the transfer screw are actuated by respective associated motors.

The use of two independent motors for moving the piston and for actuating the transfer screw makes it possible to control the motors independently from each other, making it possible to achieve very fine adjustment of the quantity to be metered out. In addition, this avoids damaging the food.

In a particular embodiment, the plug valve is mounted on the frame to be movable between an active position in which it is applied against the duct and the metering cylinder and an inactive position in which it is spaced apart from the duct and from the metering cylinder to give access to them.

It is then easy to clean the machine when the plug valve is in the inactive position.

Preferably, the machine then includes means for lifting the plug valve away from the duct and from the metering cylinder respectively in a substantially axial direction of the duct and in a substantially axial direction of the metering cylinder.

Thus, while the plug valve is moving between its active position and it inactive position, the risk of damaging the parts in contact such as the sealing elements that are interposed between the plug valve and the metering cylinder is limited.

Other characteristics and advantages of the invention appear more clearly on reading the following description of a particular non-limiting embodiment of the invention.

BRIEF DESCRIPTION OF THE DRAWINGS

Reference is made to the accompanying drawings, in which.

DETAILED DESCRIPTION OF THE INVENTION

As shown in the figures, the metering machine of the invention comprises a frame 1 on which a hopper is mounted that is designated overall by reference 2, that is of vertical axis, and that is designed to receive, in loose form, the foods to be metered out and to be canned.

The hopper 2 includes a vessel 3 defined by 4 side wall having one end closed off by a horizontal bottom 4 and its opposite end provided with a collar 5 forming an abutment for a funnel 6 connected to the frame 1 via a hinge 7 so as to tilt about a horizontal axis perpendicular to the axis of the hopper 2 between a position in which it bears against the abutment collar 5 of the vessel 3 and a position in which it is moved out of the way backwards relative to the vessel 3.

A scraper 8 is mounted inside the hopper 2 along a generator line of the funnel 6. The scraper 8 has a bottom end secured to a toothed ring 9 mounted to pivot on the collar 5 of the vessel 3 under the action of a gearwheel (not shown in the figures) which is connected to an output shaft of a motor and which meshes with the toothed wheel 9 to move the scraper 8 so that it sweeps the inside face of the funnel 6. A mixing member may be associated with or substituted for the scraper 8 for mixing the foods in the funnel 6.

Two transfer screws 10 extend horizontally at the bottom of the vessel 3. With reference to a food transfer direction, each transfer screw 10 has a downstream end that passes through an opening 11 provided in the side wall of the vessel 3 so as to project from the vessel 3 into a horizontal duct 12 which opens out in the vicinity of the bottom 4 of the vessel 3 and an upstream end that is secured to an end of a shaft 13 which passes through the side wall of the vessel 3 and which is received in a bearing 14 mounted outside the vessel 3. The shafts 13 have their ends opposite from the transfer-screws 10 equipped with gearwheels 15 which mesh with each other, and one of the shafts 13 is also provided at the same end with a driven pulley 16 connected via a belt 17 to a driving pulley 18 which is connected to an output shaft of a servomotor 19.

Each duct 12 has an inside surface surrounding the downstream end of the corresponding transfer screw 10. Axial grooves 20 are provided in said inside surface in order to constitute obstacles to the foods rotating about the axis of the transfer screw 10 so as to facilitate axial movement of said foods.

Each duct 12 has a free end which is in contact via sealing means with a body of a plug valve 21 which is also in contact via sealing means with a top end of a metering cylinder 22 of vertical axis (in this example, the sealing elements may, for example, be constituted by annular gaskets that are partially interfittable, and that have complementary frusto-conical shapes).

Figure 1:
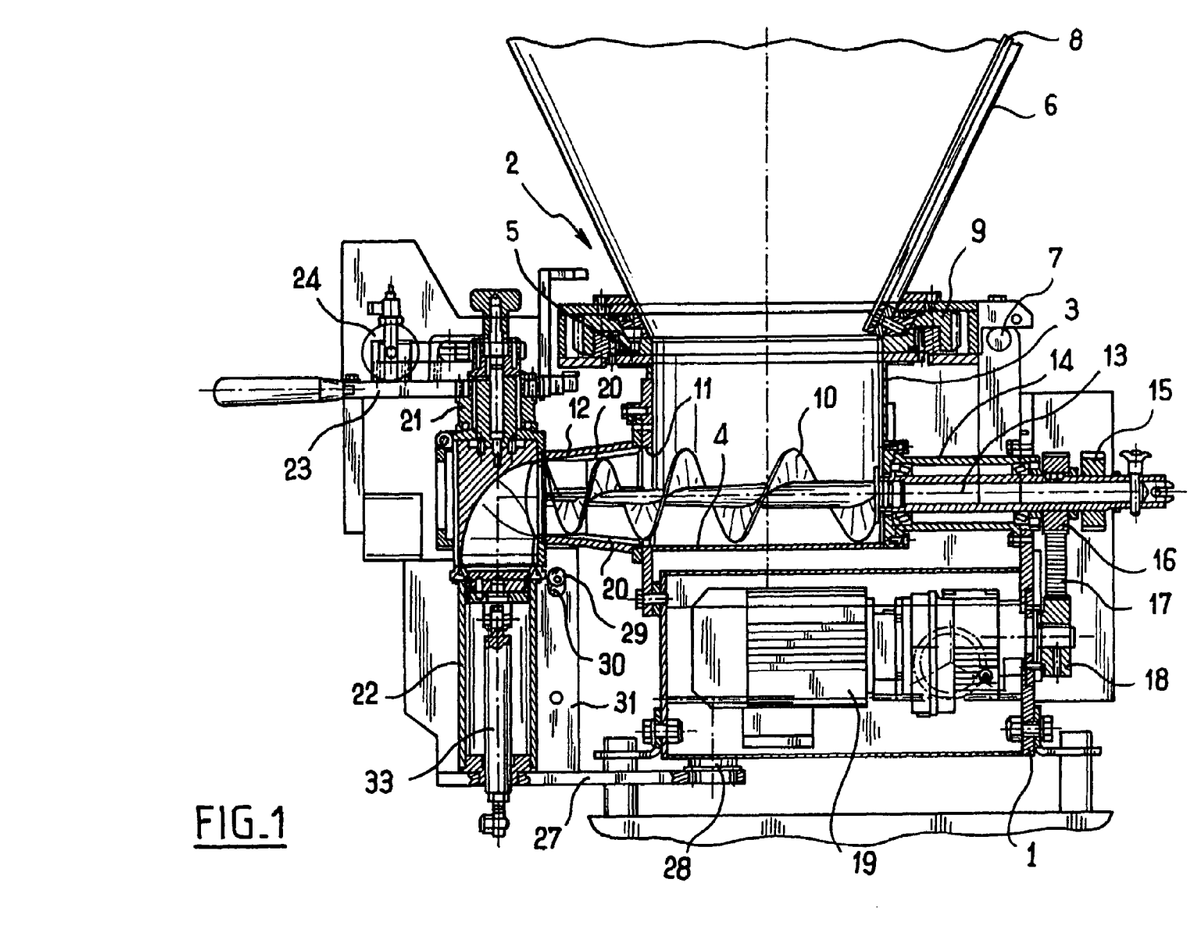
FIG. 1 is a diagrammatic fragmentary view in profile and in section, showing a metering machine of the invention.
Figure 5:
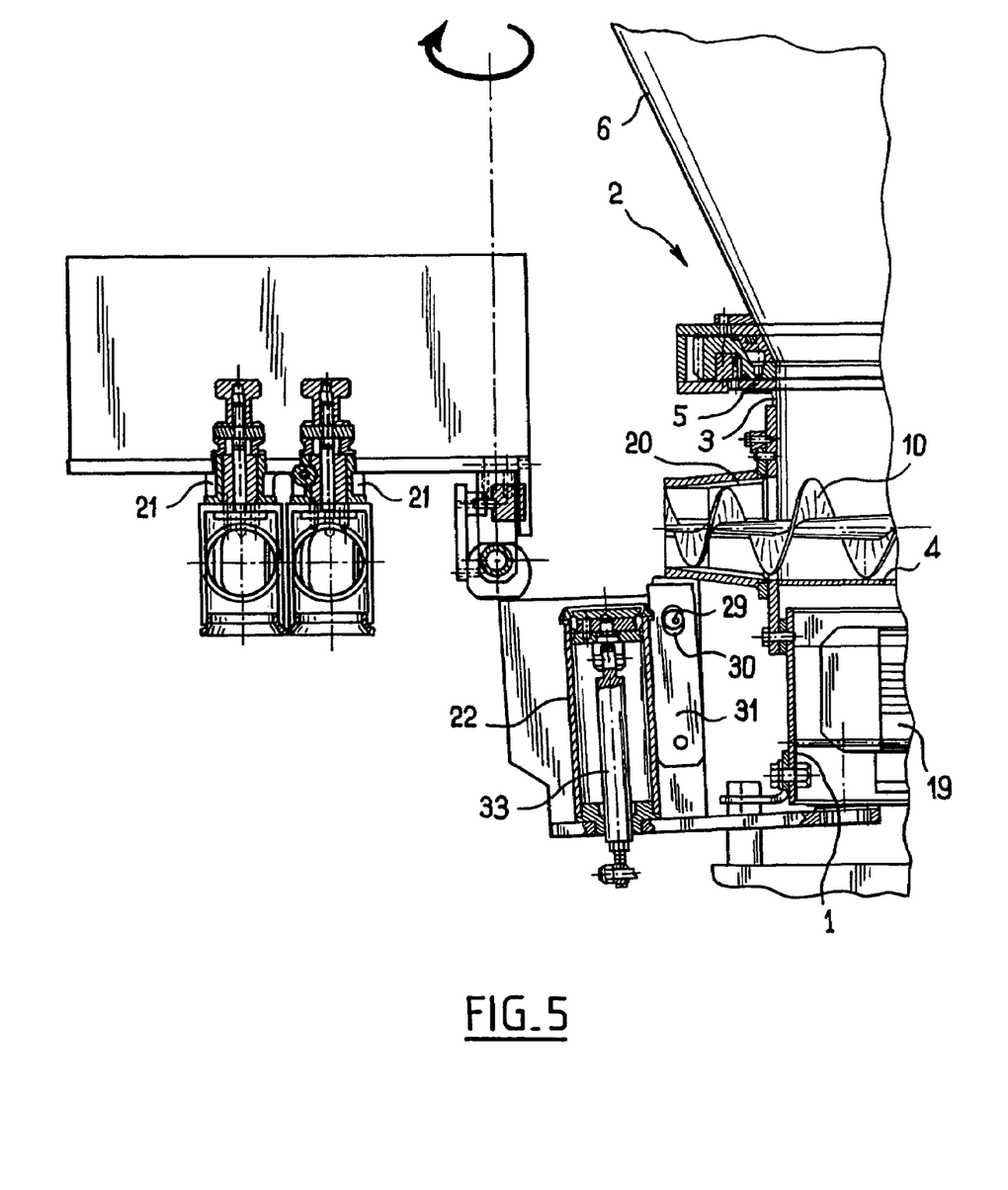

The plug of the plug valve 21 defines a channel with a bend at an angle of 90°. The plug valves 21 are mounted on a support element 23 which is mounted on the frame 1 to move between an active position (shown in FIG. 1) in which the bodies of the plug valves 21 bear against the ducts 12 and the metering cylinders 22 and an inactive position (shown in FIGS. 5 and 6) in which the plug valves are spaced apart from the ducts 12 and from the metering cylinders 22 so as to give access to them. The movement of the plug valves 21 between the active position and the inactive position is described in detail below. when the plug valves 21 are in the active position, the plug of each plug valve 21 can move between a position in which the metering chamber 22 is fed (shown in particular in FIG. 1) and in which the channel with a bend connects the duct 12 to the metering cylinder 22, and a position in which the metering cylinder 22 is emptied and in which the channel with a bend connects the metering cylinder to a support (not shown) of a can to be filled. The plugs are driven between the position in which the metering cylinders 22 are fed and the position in which the metering cylinders 22 are emptied, drive being via an actuator 24 mounted on the support element 23 for the purpose of actuating, in a manner known per se, a rack 25 which meshes with pinions 26 secured to the plugs (see FIG. 6 in particular).

Figure 3:
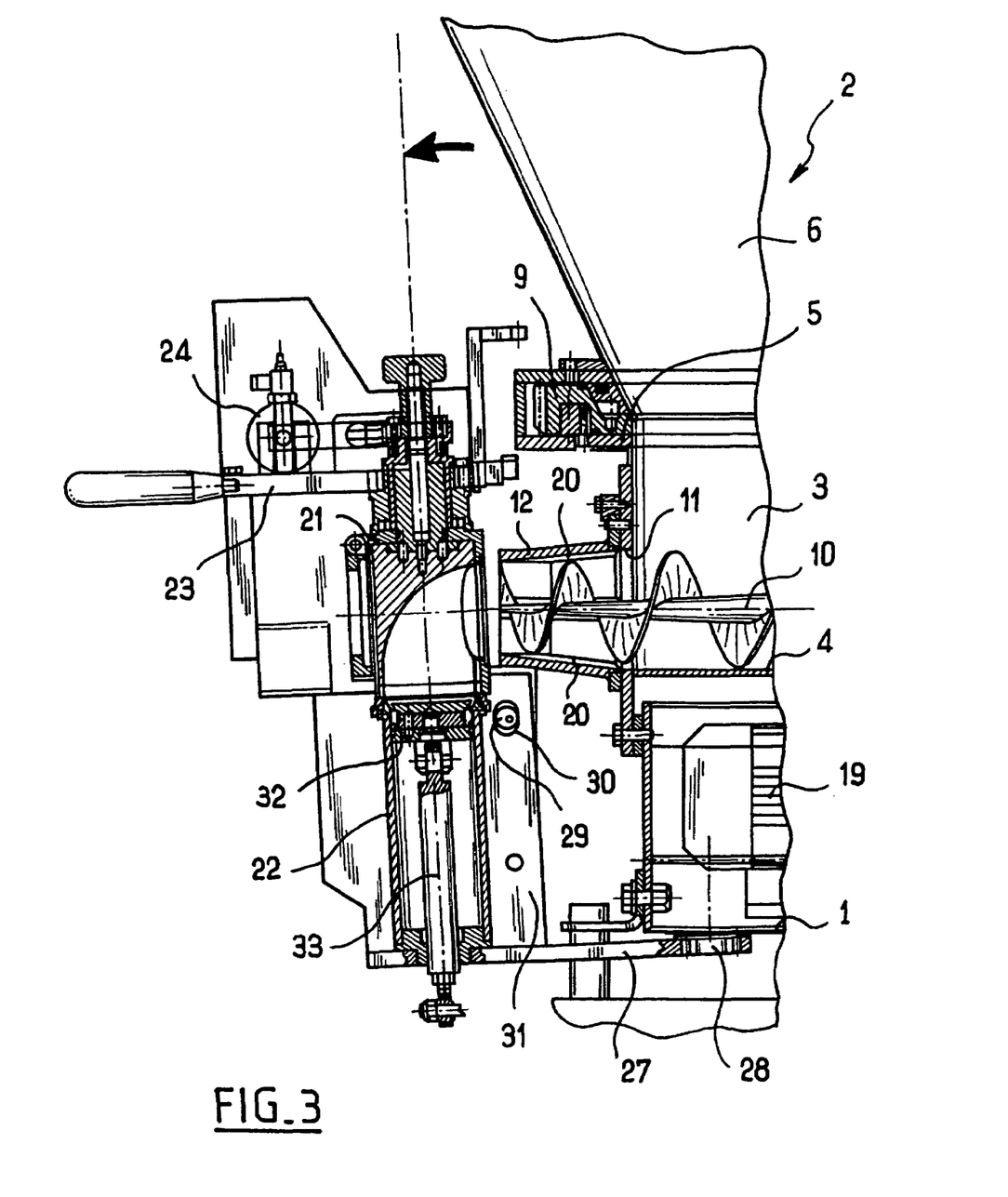
FIGS. 3, 4, and 5 are fragmentary profile views of the metering machine, breaking down the movement of components of the metering machine between an active position and an inactive position.

The support element 23 is connected to the frame 1 via a deck having one end connected to the frame 1 via a resilient coupling such as an elastically deformable pad 28 as in this example. The elastically deformable pad 28 is organized to enable the deck 27 to move angularly about an axis perpendicular to the axes of the ducts 12 and of the metering cylinders 22 between the active position of the plug valves 21 (shown in FIG. 1) in which the deck 27 is horizontal and a first intermediate position (shown in FIG. 3) in which the deck is inclined so that the bodies of the plug valves 21 are spaced apart from the free ends of the ducts 12. The deck 27 is locked in these two positions by an eccentric 29 mounted on the frame 1 to pivot about an axis parallel to the pivot axis of the deck, and received in a slot 30 provided in a plate 31 secured to the deck and perpendicular thereto. The slot 30 is oblong and has a major axis perpendicular to the deck 27 and a width equal to a diameter of the eccentric 29. The position of the eccentric 29 is organized to be controlled by an operator.

Figure 4:
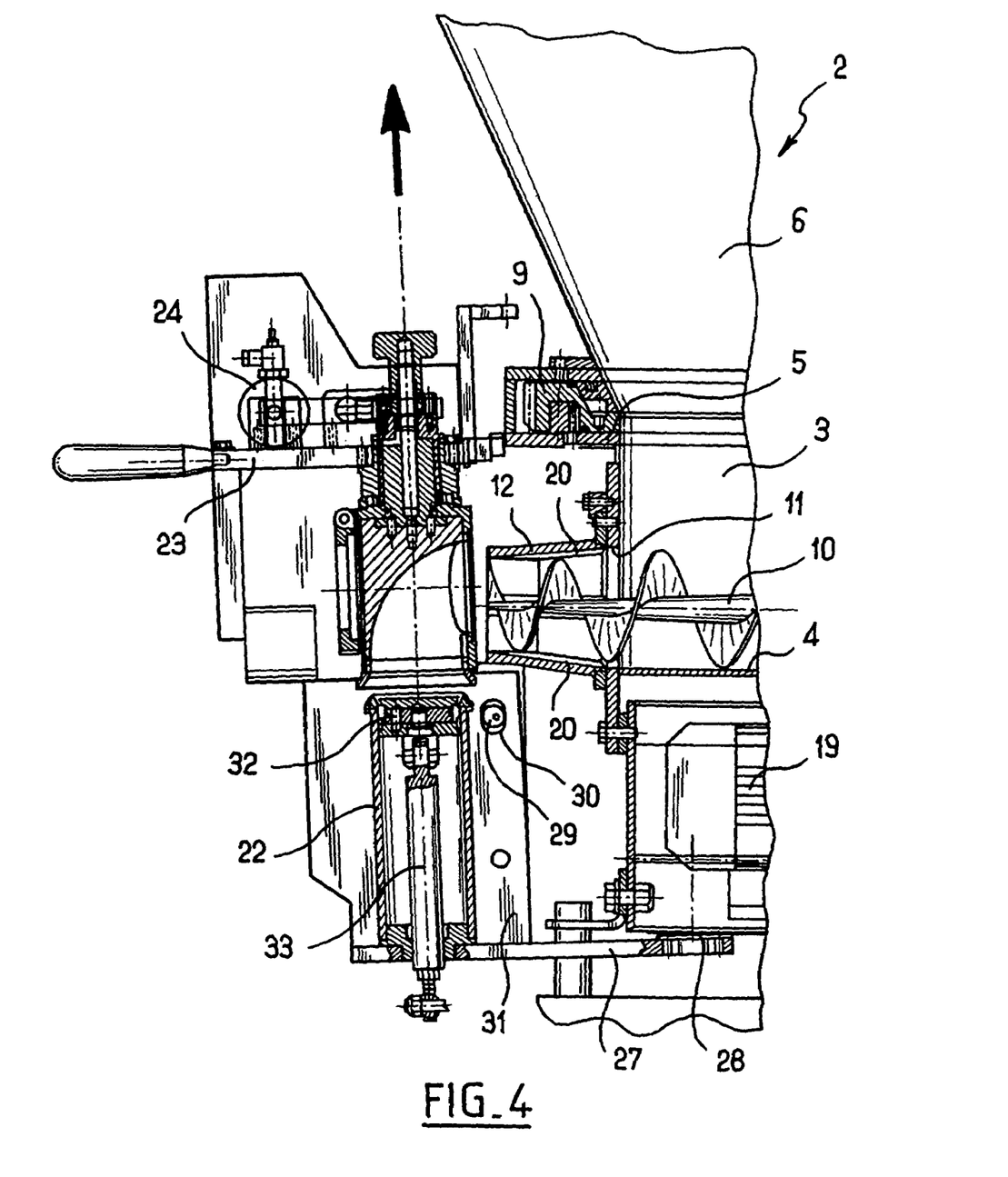

The support element 23 is mounted on the deck 27 to tilt about an axis parallel to the axes of the ducts 12 between the first intermediate position (shown in FIG. 3) and a second intermediate position (shown in FIG. 4) in which the bodies of the plug valves 21 are spaced slightly apart from the top ends of the metering cylinders 22.

Figure 6:
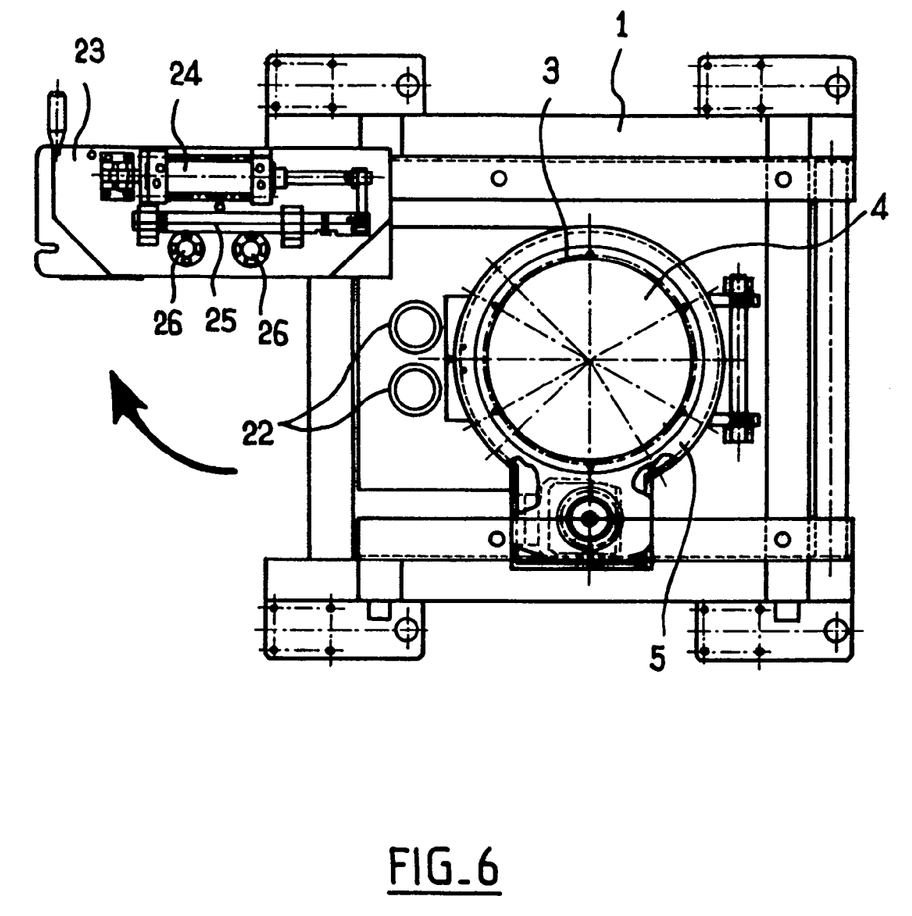
FIG. 6 is a fragmentary plan view of the metering machine when said components are in the inactive position.

The support element 23 is also mounted on the deck 27 so as to pivot eccentrically about an axis perpendicular to the plate 27 between the second intermediate position of the plug valves 21 (shown in FIG. 4) and the inactive position (shown in Figures and 6).

Figure 2:
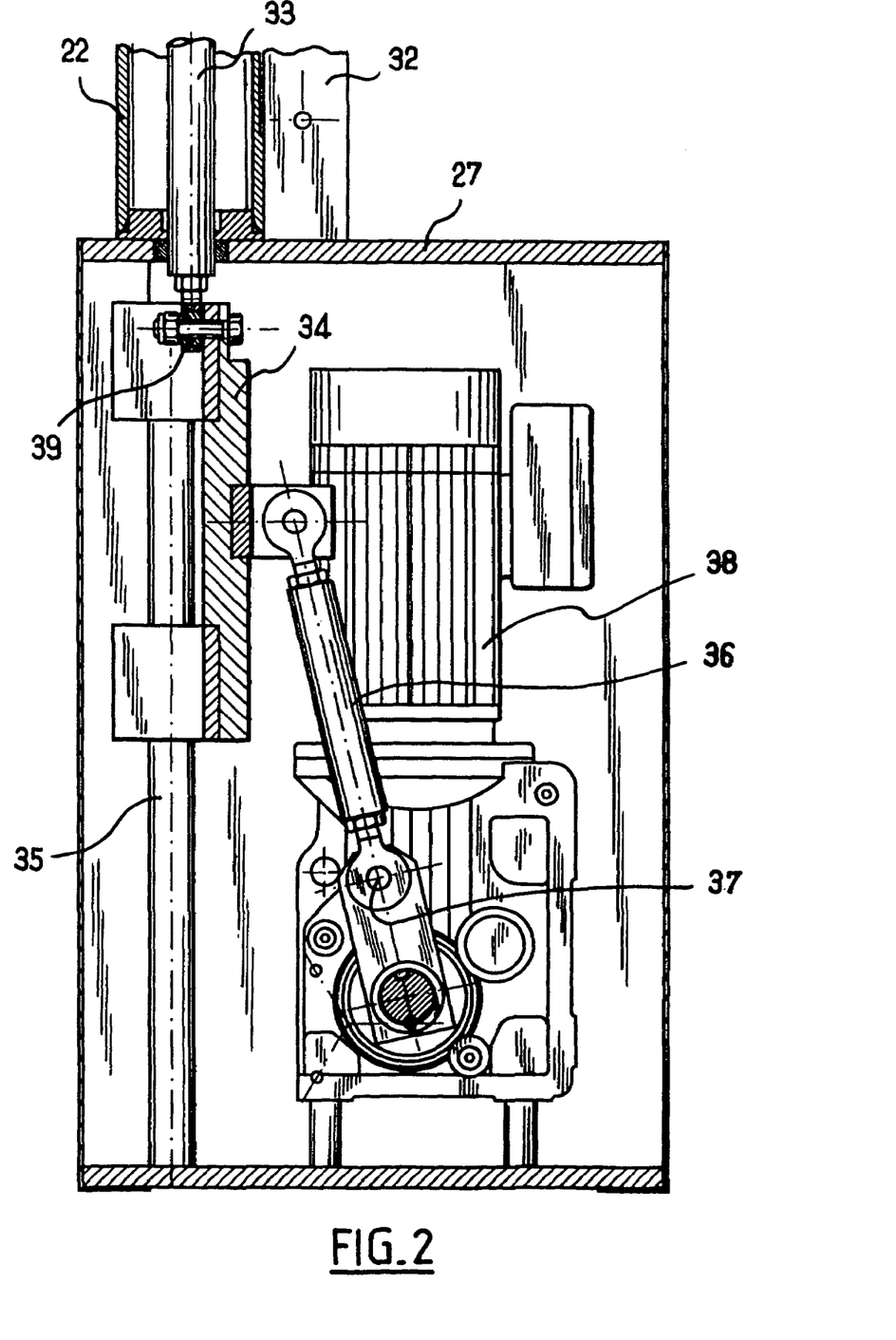
FIG. 2 is a section view of the actuating member of a piston of a metering cylinder.

Each metering cylinder 22 has a bottom end connected to the deck 27 so as to extend perpendicularly thereto. Each metering cylinder 22 receives a moving piston 32 mounted to move between a suction low position and a delivery high position. The piston 32 is connected via a rod 33 passing through the bottom of the metering cylinder 22 and through the deck 27 to a slide 34 mounted on a runner 35 fixed under the deck 27 and perpendicularly thereto. The slide 34 is connected via a link 36 to a crank pin 37 secured to an output shaft of a servomotor 38 which is also fixed under the deck 27 (see FIG. 2). Preferably, the length of the link 36 is adjustable to make it possible to adjust the position of the piston. It is also possible to make provision for the distance between the crank pin 37 and the output shaft to be adjustable, which would enable the stroke of the piston to be adjusted to match the quantity to be metered out. The rod 33 is connected to the slide 34 via a ball coupling 39.

Operation of the metering machine of the invention is similar in principle to operation of known metering machines.

However it should be noted that the servomotors 19 driving the transfer screws 10 and the servomotor 38 driving the pistons 32 may be parameterized independently from one another in order to adjust precisely firstly the quantity of food to be metered out and secondly any compression of the food to be metered out in the metering cylinder 22.

In order to clean the metering machine, the funnel 6 is tilted for the purpose of cleaning the vessel 3 and the transfer screws 10.

The plug valves 21 are also brought from their active position to their inactive position.

For this purpose, firstly the plug valves are brought from their active position to their first intermediate position by acting on the eccentric 21, before the support element 23 and the plug valves 21 are tilted into their second intermediate position, and then into their inactive position. Thus, the forces that are exerted on the portions in contact of the metering cylinders 22, of the ducts 12, and of the plug valve bodies 21 are limited, and the risks of damaging the sealing elements are limited.

Naturally, the invention is not limited to the embodiment described, and variant embodiments are possible without going beyond the ambit of the invention as defined by the claims.

In particular, the coupling between the plug valves 21 and the frame 1 may be of structure that is different from the structure described but that, like said structure, makes it possible preferably to lift the plug valves 21 away from the ducts 12 and away from the metering cylinders 21 respectively in a substantially axial direction of the ducts and in a substantially axial direction of the cylinders as they move from their active position to the inactive position.

In addition, the angle between the duct 12 and the metering cylinder 22 may be different from 90°, and it is then preferably greater than 90°, but may also be slightly less than 90°.

What is claimed is:

1. A metering machine comprising:
   a frame receiving a hopper:
   at least one duct opening out into the hopper in the vicinity of a bottom thereof and receiving firstly a portion of a transfer screw extending at the bottom of the hopper; and
   at least one metering cylinder, which slidably receives a suction and delivery piston and which is connected to the duct via a plug valve:
   wherein the metering cylinder and the duct have axes forming an angle of approximately at least 90° C. between them, and wherein the duct and the transfer screw are substantially horizontal, and wherein the metering cylinder extends substantially vertically under the plug valve.

2. A metering machine comprising:
   a frame receiving a hopper:
   at least one duct opening out into the hopper in the vicinity of a bottom thereof and receiving firstly a portion of a transfer screw extending at the bottom of the hopper: and
   at least one metering cylinder which slidably receives a suction and delivery piston and which is connected to the duct via a plug valve;
   wherein the metering cylinder and the duct have axes forming an angle of approximately at least 90° between them, and wherein the piston and the transfer screw are actuated by respective associated motors.

3. The metering machine according to claim 2, wherein the hopper includes a scraper mounted to pivot in the hopper and associated with an independent drive motor.

4. The metering machine according to claim 1, wherein the plug valve is mounted on the frame to be movable between an active position in which it is applied against the duct and the metering cylinder and an inactive position in which it is spaced apart from the duct and from the metering cylinder to give access to them.

5. The metering machine according to claim 4, including means for lifting the plug valve away from the duct and from the metering cylinder respectively in a, substantially axial direction of the duct and in a substantially axial direction of the cylinder.

6. The metering machine according to claim 5, wherein the plug valve is mounted on the frame to pivot about an axis parallel to the axis of the metering cylinder between the inactive position and a disengaged position lose to the active position and in which the plug valve is slightly spaced apart from the duct and from the metering cylinder.

7. The metering machine according to claim 6, wherein the plug valve is mounted on the frame to pivot about an axis that is substantially perpendicular to the axis of the duct and to the axis of the metering cylinder between a position in which it is applied against the duct and a position in which it is slightly spaced apart from the duct.

8. The metering machine according to claim 6, wherein the plug valve is mounted on the frame to pivot about an axis that is substantially parallel to the axis of the duct between a position in which it is applied against the metering cylinder and a position in which it is slightly spaced apart from the metering cylinder.

9. The metering machine according to claim 2, wherein the piston and the transfer screw are actuated by respective associated motors.

10. The metering machine according to claim 9, wherein the hopper includes a scraper mounted to pivot in the hopper and associated with an independent drive motor.

* * * * *

UNITED STATES PATENT AND TRADEMARK OFFICE
CERTIFICATE OF CORRECTION

PATENT NO.         : 7,048,157 B2                                             Page 1 of 1
APPLICATION NO.    : 10/644332
DATED              : May 23, 2006
INVENTOR(S)        : Marchadour It is certified that error appears in the above-identified patent and that said Letters Patent is hereby corrected as shown below:

In Column 5, Claim 1, line 21, please delete the "C"
In Column 6, Claim 6, line 15, please delete the word "lose" and replace with --close--.
In Column 6, Claim 9, line 33, please delete "2" and replace with --1--.

Signed and Sealed this

Third Day of April, 2007

JON W. DUDAS
*Director of the United States Patent and Trademark Office*